United States Patent [19]

Delperdang et al.

[11] Patent Number: 5,450,717
[45] Date of Patent: Sep. 19, 1995

[54] CROP AERATOR

[75] Inventors: Douglas J. Delperdang; Leonard R. Bailey, both of Claremore, Okla.

[73] Assignee: Parham Industries, Inc., Claremore, Okla.

[21] Appl. No.: 223,161

[22] Filed: Apr. 5, 1994

[51] Int. Cl.⁶ .................... A01D 78/00; A01D 78/14
[52] U.S. Cl. ........................ 56/366; 56/372; 56/DIG. 1
[58] Field of Search .............. 166/366, 367, 370, 372, 166/DIG. 21

[56] References Cited

U.S. PATENT DOCUMENTS

| | | | |
|---|---|---|---|
| 4,524,575 | 6/1985 | Nilsen | 56/372 |
| 4,685,282 | 8/1987 | Allen | 56/367 X |
| 4,738,092 | 4/1988 | Jennings | 56/366 X |
| 4,748,803 | 6/1988 | MacMaster et al. | 56/366 X |
| 4,793,125 | 12/1988 | Ehrhart et al. | 56/370 X |
| 5,203,154 | 4/1993 | Lesher et al. | 56/366 |
| 5,301,496 | 4/1994 | Sudbrack et al. | 56/366 |

*Primary Examiner*—George A. Suchfield
*Attorney, Agent, or Firm*—Head and Johnson

[57] ABSTRACT

An aerator for crops such as hay which is pulled by a tractor or other vehicle. The aerator includes a first header conveyor to lift a first swath from the ground onto the first header conveyor. A first hitch extends between the tractor and the first header conveyor. A first rear conveyor transports the swath from the first header conveyor and thereafter returns it to the ground. A second header conveyor lifts a second, adjacent swath from the ground onto the second header conveyor. A second hitch extends between the first hitch and the second header conveyor. A second rear conveyor transports the swath from the second header conveyor and thereafter returns it to the ground.

19 Claims, 4 Drawing Sheets

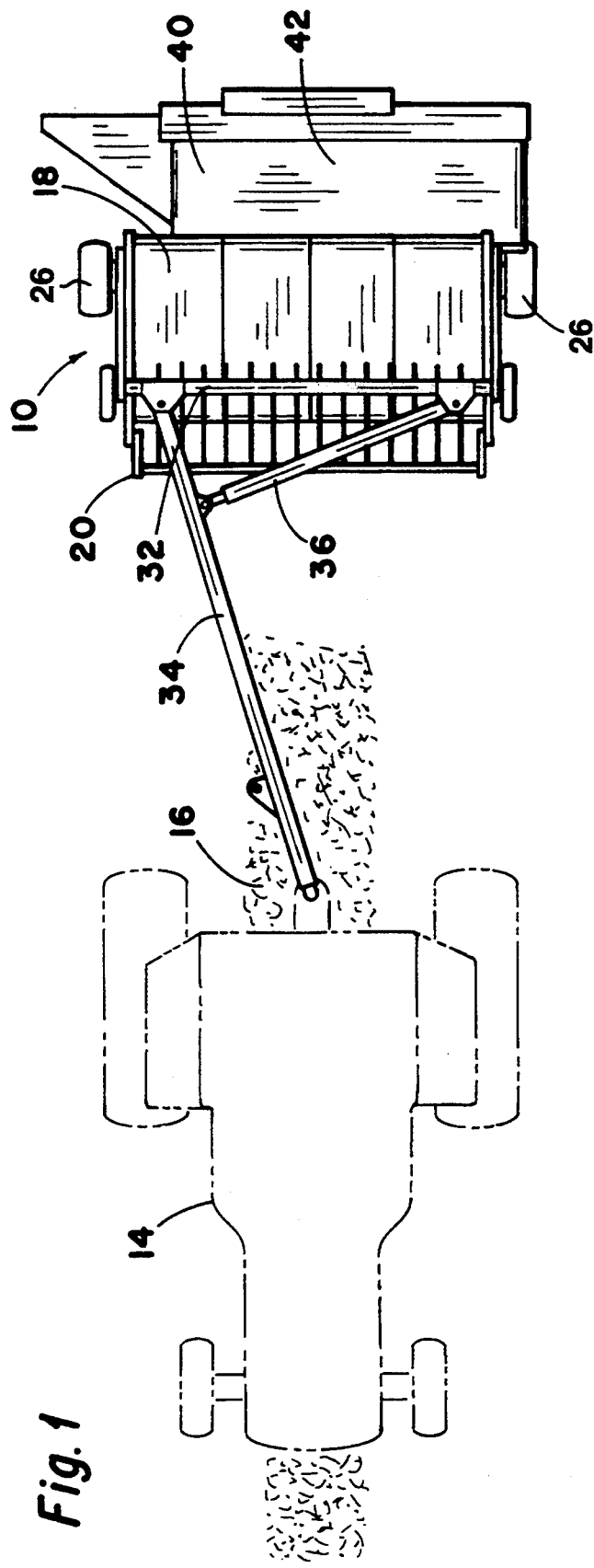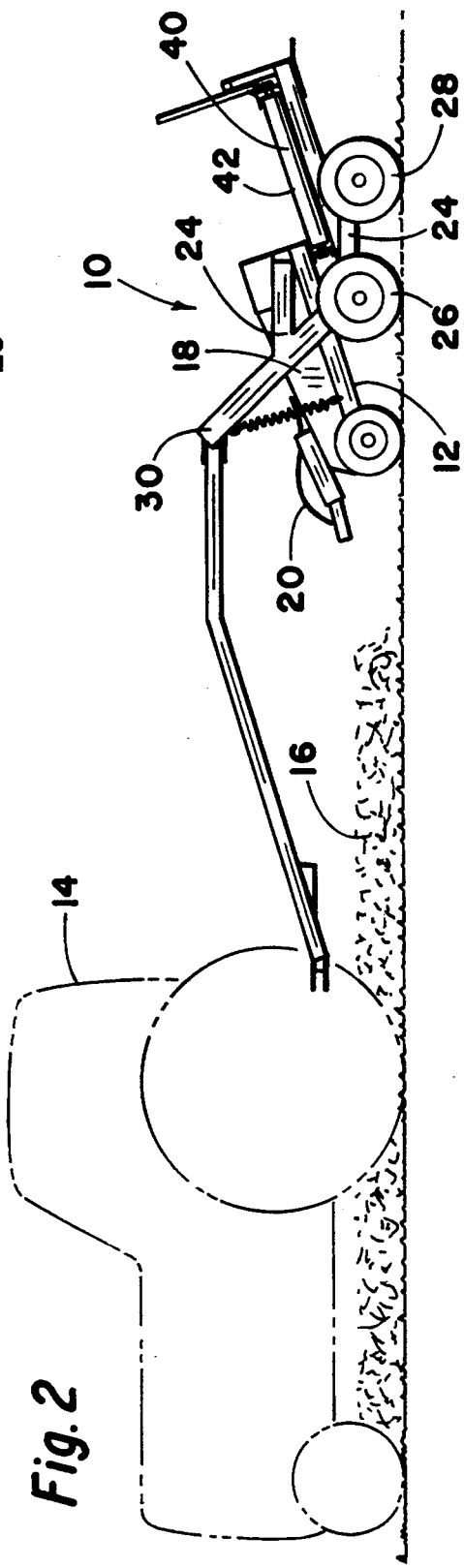

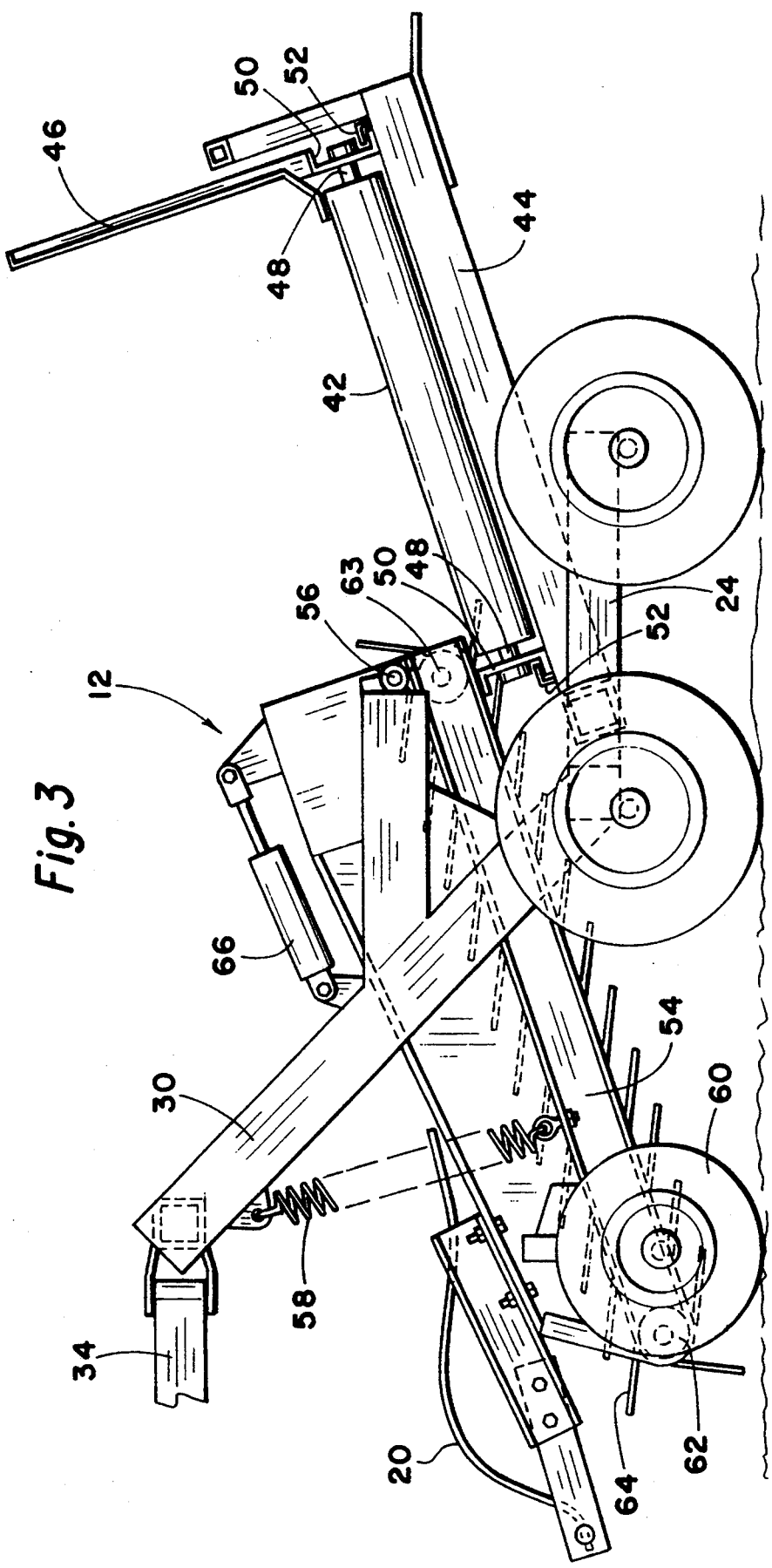

CROP AERATOR

BACKGROUND OF THE INVENTION

1. Field of the Invention

The present invention is directed to a device to aerate crops such as hay.

2. Prior Art

Fields of hay or other crops are often cut and then allowed to lay down on its side for drying. Often, the hay is deposited in a series of substantially parallel rows in order to dry prior to harvesting. This is accomplished in a variety of ways such as a windrow attachment to a mower. After drying, the crop will be gathered from the rows or swaths.

The swaths or rows will often dry slower than desired. Additionally, the top of the swath or row may be subject to nutritional loss due to sun bleaching.

The ground under the windrow may become wet because of moisture and the covering by the windrow.

Accordingly, there is a need to provide a device that can lift a swath or row from the ground, aerate it and return it back to the ground.

Additionally, there is a need to provide a device that will aerate a swath or row and optionally turn the top of the swath or row onto the bottom.

There is also a need to provide a device that will lift a swath or row, aerate it and return it to a different position on the ground.

Additionally, there is a need to provide an aerator device that will be able to aerate multiple swaths or rows of hay at the same time. While a single, wide device might be employed for multiple rows, these are unwieldy and cannot be transported easily. This is particularly true if the device is required to travel on public highways.

Therefore it is a principal object and purpose of the present invention to provide a device that can lift a swath or row from the ground, aerate it, and return it back to the ground.

It is an additional object and purpose of the present invention to provide a crop aerator to aerate a swath or row and turn over the swath or row so that the top of the hay is on the bottom.

It is an additional object and purpose of the present invention to provide a device to lift a swath or row from the ground, aerate the swath or row and return it to a different position on the ground.

It is a further object and purpose of the present invention to provide an aerator device to aerate multiple swaths or rows at the same time.

SUMMARY OF THE INVENTION

The present invention provides an aerator for crops such as hay which may be operated as a single unit or operated in a double or tandem unit. The aerator would be pulled or drawn across a field by a tractor, vehicle or the like.

The aerator is used to lift a swath or row from the ground, aerate it and then return the swath or row to a row. The first aerator unit includes a header conveyor having a continuous belt that rotates. Extending in front of the header conveyor may be an optional wind guard which prevents the swath or row from being lifted from the ground being dispersed by the wind.

The first aerator unit includes a main frame on which are mounted a pair of front wheels and a pair of rear wheels. The main frame also includes an upwardly extending neck having a transverse beam. A hitch pivotally extends between the transverse beam and the rear of the tractor. An adjustable hitch brace arm extends between the hitch and the transverse beam. The length of the hitch brace arm is adjustable so that the angle between the hitch and the transverse beam may be altered, thus, changing the lateral placement of the aerator unit with respect to the tractor.

Directly behind the header conveyor is a rear conveyor mechanism which includes a continuous rear belt. The rear belt moves in a direction transverse to the movement of the aerator unit and generally transverse to the swath or row. Accordingly, a swath or row moving onto the rear conveyor will be deposited and returned back to the ground in a different location than the existing row.

The main frame includes a rear conveyor frame. The rear conveyor frame may be horizontal to the ground or may be at a pitch or tilt with respect to the ground. The tilt orientation may be employed to encourage turning of the swath or row.

Extending vertically from the rear conveyor frame is a back shield to prevent the swath or row on the rear conveyor from falling off or being blown off. The rear conveyor belt moves about a pair of rollers which are mounted on movable brackets retained on the frame by angle irons.

The header conveyor includes a header frame pivotally connected to the main frame at a transverse pivot rod. The main frame is also connected to the header frame by an extension spring extending between the neck and the header frame. The header frame includes a pair of idler wheels which move on the ground during operation. The header frame will, thus, move vertically in response to the terrain independent of the main frame.

The header conveyor includes a continuous belt extending between a pair of header rollers. Extending outward from the exterior of the belt are extending fingers which may be bolted or otherwise secured to the belt. As the belt rotates and passes the lowermost roller, the fingers will approach near the level of the ground. The fingers will enter into the crop swath or row and as the belt continues to move, lift the swath or row.

As the header conveyor continues to rotate with the swath or row on the belt, the swath or row will move across the header conveyor and toward the rear conveyor. The crop will thereafter fall down onto the rear conveyor. The rear conveyor may be rotated in either direction so that the crop may be returned on either side of the aerator.

The rear conveyor may also be moved laterally with respect to the header conveyor. This is accomplished by changing the position of the movable brackets and then re-securing them to the angle irons. The row which is deposited and returned to the ground will therefor be placed in a different lateral position from the swath or row being lifted onto the aerator.

When the aerator unit is not in use, a hydraulic ram or arm can be utilized to raise the header frame and idle wheel off the ground.

The aerator may also be arranged in double or tandem units. With the aerator arranged in double units, two adjacent swaths or rows may be aerated simultaneously. The first unit is arranged to be not only spaced behind the tractor but spaced laterally from the tractor. The second aerator unit is behind the tractor and spaced laterally from the first aerator unit. The spacing between the units may be adjusted to accommodate the distance between swaths or rows of the crop. Accordingly, the aerator units are lined up with two, adjacent rows or swaths. Each aerator unit is interchangeable and identical.

The tandem units may be utilized to lift and aerate two adjacent rows or swaths and then deposit them in a single, merged row.

BRIEF DESCRIPTION OF THE DRAWINGS

FIG. 1 is a top view of an aerator for crops such as hay constructed in accordance with the present invention pulled by a tractor shown in dashed lines;

FIG. 2 is a side view of the aerator unit shown in FIG. 1;

FIG. 3 is an elevational view of the aerator unit shown in FIG. 1 with the hitch partially cut-away;

DETAILED DESCRIPTION OF THE PREFERRED EMBODIMENTS

Figure 4:
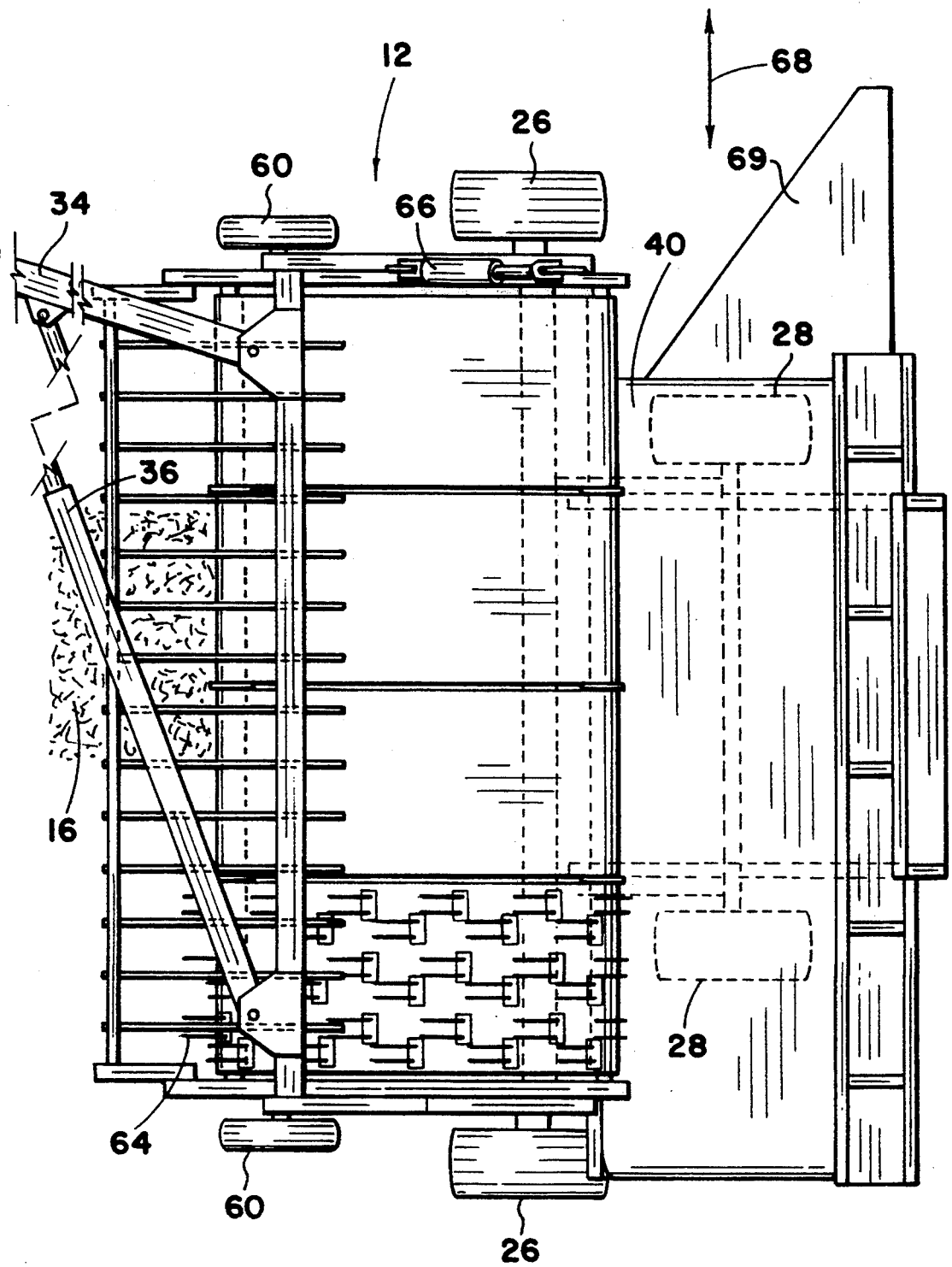
FIG. 4 is a plan view of the aerator shown in FIG. 1 with the hitch and hitch brace arm partially cut-away.

Referring to the drawings in detail, FIG. 1 illustrates a top view of an aerator 10. As will described in detail, the aerator of the present invention may operate as a single unit 12 as shown in FIGS. 1, 2, 3 and 4 or may operate in a double or tandem unit as will be described hereinafter.

The aerator of the present invention would be used with swaths or windrows of a crop. A swath would be produced where a crop is cut and then allowed to lay down on the ground. A windrow is produced where the crop is cut and then gathered or raked into a row.

The aerator 10 would be pulled or drawn across a field by a tractor, vehicle or like device 14 (shown in dashed lines). In operation, the tractor 14 will move across a field aligned with or parallel to the swaths or rows of hay.

While the present invention is described for use with hay, it will be understood that the invention may also have application to other crops.

The aerator 10 would be used to lift a crop from a row or swath on the ground, aerate the crop and then return the crop to a row 16.

A first aerator unit 12 includes a header conveyor 18. The header conveyor 18 includes a continuous belt that rotates clockwise with respect to the side view shown in FIG. 2. The header conveyor may consist of a single belt or a number of aligned belts. Extending in front of the header conveyor may be an optional wind guard 20 which acts to prevent the crop being lifted from the ground from being dispersed or blown away by the wind.

The first aerator unit 12 includes a mainframe 24 onto which are mounted a pair of front wheels 26 and a pair of rear wheels 28.

The main frame includes an upwardly extending neck 30 having a traverse beam 32, as best seen in FIG. 1. A hitch 34 pivotally extends between the transverse beam 32 and the rear of the tractor 14. A pivot pin or other known connection may be utilized both at the connection between the tractor and hitch and the connection between hitch and beam.

An adjustable hitch brace arm 36 extends between the hitch 34 and the transverse beam 32. The transverse beam, the hitch brace arm 36 and a portion of the hitch 34 form a triangle. As will be described herein, the length of the hitch brace arm 36 may be adjusted which will alter the angle between the hitch 34 and the transverse beam 32, thus, changing the lateral placement of the aerator unit 12 in respect to the tractor 14. Once the position of the aerator unit is chosen, the length of the hitch brace arm will be fixed with a pin or other fastening mechanism.

Directly behind the header conveyor 18 is a rear conveyor mechanism 40 which includes a continuous rear belt 42. The rear belt 42 moves in a direction transverse to the movement of the aerator unit and generally transverse to the swath or row. Accordingly, hay moving on the rear conveyor will be deposited and returned back to the ground in a different location than the existing swath or row 16.

FIG. 3 illustrates an elevational view of the first aerator unit 12. The main frame 24 includes a rear conveyor frame 44. The rear conveyor frame 44 in the present embodiment is at a pitch or tilt with respect to the ground, although it will be understood that other orientations, such as horizontal to the ground may be employed. Whatever orientation is chosen for the rear conveyor, the edge abutting the header conveyor will be lower than the header conveyor so that the crop will fall onto the rear conveyor.

Extending vertically from the rear conveyor frame 44 is a back shield 46 to prevent the crop on the rear conveyor from falling off or being blown off. The rear belt 42 moves about a pair of parallel rollers 48 (one of which is visible in FIG. 3). The rollers 48 are mounted on movable brackets 50 retained on the frame by angle irons 52.

The header conveyor 18 includes a header frame 54 which is pivotally connected to the main frame at transverse pivot rod 56. The main frame is also connected to the header frame by an extension spring 58 extending between the neck 30 and the header frame 54.

The header frame 54 includes a pair of idler wheels 60 which move on the ground. By virtue of the pivotal connection of the header frame 54 to the main frame 24 and the extension spring 58 extending therebetween, the header frame 54 will move vertically in response to the terrain independent of the main frame. If the idler wheels 60, thus, encounter a gully or indentation in the ground, the header conveyor 18 will move downward even if the mainframe remains constant.

In FIG. 3 the hitch 34 is cut-away and only a portion shown. The wind guard 20 extends in front of the header conveyor 18.

The header conveyor 18 includes a continuous belt extending between a pair of header rollers 62 and 63 (shown by dashed lines). Extending outward from the continuous belt are extending fingers 64 which may be bolted or otherwise secured to the belt. As the belt rotates clockwise and passes the lowermost roller 62, the fingers 64 will approach near the level of the ground. The fingers 64 will then enter the swath or row. As the belt continues to rotate and the aerator moves forward, the swath or row will be lifted up by the fingers onto the header conveyor.

Extending between the mainframe 24 and the header frame 54 is a hydraulic arm or ram 66. When the aerator unit is not in use, the hydraulic arm 66 can be operated to raise the header frame 54 and idler wheel 60 off the ground for easy transportation of the aerator unit using the mainframe.

FIG. 4 is a plan view of the first aerator unit 12. As the tractor moves the aerator and the row or swath is approached by the aerator, the extending fingers will gently lift the row or swath 16 from the ground onto the header conveyor belt without loss of leaves. It has been found that the device can pick up the crop going with or against the cut of the crop.

As the header conveyor 18 continues to rotate, the crop will move from the ground onto the header conveyor and toward the rear conveyor 40.

As the header conveyor continues, the crop will thereafter fall onto the rear conveyor 40. The rear conveyor 40 may be rotated in either direction so that the crop may be returned to the ground on either side of the aerator unit 12.

With reference to FIG. 3 and continued reference to FIG. 4, the rear conveyor 40 may be moved laterally with respect to the header conveyor. This may be accomplished by changing the position of the movable brackets 50 and then securing them to the angle irons 52 with bolts, pins or other fasteners. The crop which is deposited and returned to the ground will thereafter be placed in a different lateral position from the swath or row being lifted onto the aerator. The rear conveyor 40 may be moved laterally in the direction shown by arrows 68 in FIG. 4. As the crop leaves the rear conveyor, an optional turner plate 69 assists in turning over the crop.

Figure 5:
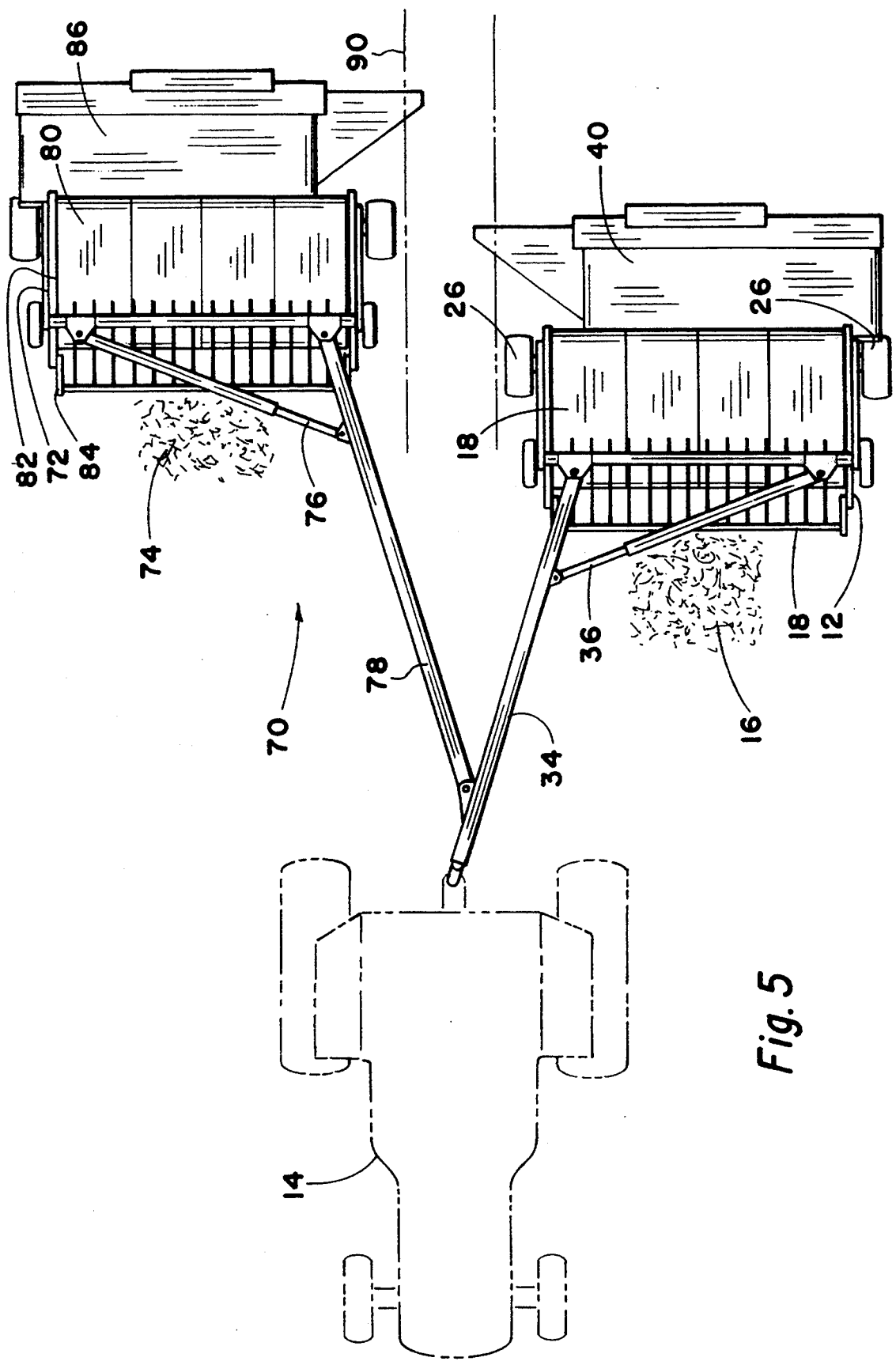
FIG. 5 is an aerator for crops such as hay in a tandem arrangement pulled by a tractor shown in dashed lines.

FIG. 5 is a top view of an aerator 10 arranged in the double or tandem units 70. With the aerator arranged in the double or tandem units, the aerator 10 can aerate two adjacent rows at the same time. The first unit 12 has been arranged to be not only be spaced behind the tractor 14 but spaced laterally from the tractor. The second aerator unit 72 is behind the tractor and spaced laterally from the first aerator unit 12, so that it is lined up with a second, adjacent row of crop 74.

When working with windrows, the spacing between the parallel rows or swaths will vary. Accordingly, the lateral spacing between the first aerator unit 12 and the second aerator unit 72 is variable. This is accomplished by either extension or retraction of the hitch brace arm 36 on the first aerator unit 12 and by extension or retraction of the hitch brace arm 76 of the second aerator unit 72.

While the hitch 34 of the first unit is pivotally connected with the rear of the tractor 14, the hitch 78 of the second unit is pivotally connected to the hitch 34 of the first unit.

It will be observed that the second unit 72 is identical to the first unit 12 and the aerator units are completely interchangeable with each other.

The second unit 72 includes a header conveyor 80 supported by a header frame 82 from which may extend a wind guard 84. The header conveyor 80 is independent from the main frame.

The present aerator 10 has the ability to approach, lift up, aerate and deposit back two adjacent rows or swaths at the same time. Additionally, the aerator 10 has the ability to lift and aerate two adjacent rows or swaths and join or merge them into a single, larger row. The outline of the resulting, merged row is seen by the dashed lines 90. By merging a pair of swaths or rows together, less work will be involved when the time to gather the crop arrives.

The header conveyor and rear conveyor of each unit may be powered in a variety of ways. In one embodiment, the aerator units 12 and 72 are powered by the hydraulic system of the tractor 14. Two hydraulic motors may be utilized for each aerator unit. One hydraulic motor may be used for the header conveyor 18 while a second hydraulic motor may be used for the rear conveyor 40. Likewise, one hydraulic motor may be used for the header conveyor 80 of the second unit 72, while a second hydraulic motor may be used for the rear conveyor 86. Hydraulic lines may extend between the tractor and the aerator units. In one embodiment, a flow divider may be interposed in the hydraulic lines. The main hydraulic flow from the tractor may be divided into two equal sections by gearing which allows the same volumetric flow to each unit.

Both units will be operating at the same speed. Additionally, hydraulic ram 66 which may be used to lift the header conveyor when the system is not in use may be driven by the hydraulic system of the tractor.

Whereas, the present invention has been described in relation to the drawings attached hereto, it should be understood that other and further modifications, apart from those shown or suggested herein, may be made within the spirit and scope of this invention.

What is claimed is:

1. An aerator for crops such as hay pulled by a tractor or other vehicle, which aerator comprises:
    a) first header conveyor means to lift a first swath or row of said crop from the ground onto said first header conveyor means;
    b) first hitch means extending between said tractor and said first header conveyor means;
    c) first rear conveyor means to transport said swath or row from said first header conveyor means and return to said ground;
    d) second header conveyor means to lift a second swath or row of said crop from the ground onto said second header conveyor;
    e) second hitch means extending between said first hitch means and said second header conveyor means; and
    f) second rear conveyor means to transport said swath or row from said second header conveyor means and thereafter return to said ground.

2. An aerator for crops such as hay as set forth in claim 1 wherein said first hitch means includes a first adjustable hitch brace arm to vary the lateral position of said first header conveyor with respect to said tractor.

3. An aerator for crops such as hay as set forth in claim 1 wherein said second hitch means includes a second adjustable hitch brace arm to vary the lateral position of said second header conveyor means with respect to said tractor.

4. An aerator for crops such as hay as set forth in claim 1 wherein said first rear conveyor means and said second rear conveyor means operate to return said first and said second swath or row to a single row.

5. An aerator for crops such as hay as set forth in claim 1 wherein said first header conveyor means includes a continuous belt having a plurality of extending fingers which engage and lift said first swath or row.

6. An aerator for crops such as hay as set forth in claim 2 said first hitch means is pivotally connected to said tractor and said first header conveyor means and including means to adjust the length of said first hitch brace arm in order to adjust the lateral position of said first header conveyor.

7. An aerator for crops such as hay as set forth in claim 1 wherein said first rear conveyor means includes a continuous rear belt which moves transverse to said first header conveyor means to deposit said swath or row in a different place.

8. An aerator for hay rows as set forth in claim 7 including turner plate means extending from said continuous rear belt to turn over said swath or row from the top and place on bottom.

9. An aerator for crops such as hay as set forth in claim 1 wherein said second header conveyor means includes a continuous belt having a plurality of extending fingers which engage and lift said second swath or row.

10. An aerator for crops such as hay as set forth in claim 3 wherein said second hitch means is pivotally connected to said tractor and said second header conveyor means and including means to adjust the length of said second hitch brace arm in order to adjust the lateral position of said second header.

11. An aerator for crops such as hay, pulled by a tractor or other vehicle, which aerator comprises:
a) means to hitch a first aerator unit behind and spaced from said tractor;
b) first header conveyor means for said first aerator unit to lift a first swath or row from the ground onto said first header conveyor means;
c) first rear conveyor means for said first aerator unit to transport said swath or row from said first conveyor means and return said swath or row to the ground; d) means to hitch a second aerator unit behind said tractor and spaced laterally from said first aerator unit;
e) second header conveyor means for said second unit to lift a second, adjacent swath or row from the ground onto said conveyor means; and
f) second rear conveyor means for said second unit to transport said swath or row from said second conveyor means and return said swath or row to the ground.

12. An aerator for crops such as hay as set forth in claim 11 including a first main frame having a transverse beam and wherein said means to hitch a first aerator unit behind and spaced from said tractor includes a hitch pivotally extending between said tractor and said transverse beam.

13. An aerator for crops such as hay as set forth in claim 12 wherein said first header conveyor means is pivotally connected to said main frame.

14. An aerator for crops such as hay as set forth in claim 11 including a second main frame having a transverse beam and wherein said means to hitch a second aerator unit behind said tractor includes a hitch pivotally extending between said means to hitch a first aerator unit and said second transverse beam.

15. An aerator for crops such as hay as set forth in claim 14 wherein said second header conveyor means is pivotally connected to said main frame.

16. An aerator for crops such as hay as set forth in claim 11 wherein said first rear conveyor means and said second rear conveyor means operate to return said first and said second swaths or rows to a single row.

17. An aerator for crops such as hay as set forth in claim 11 wherein said first unit and said second unit are interchangeable.

18. An aerator for hay rows as set forth in claim 11 including means to adjust the lateral placement of said first rear conveyor means with respect to said first header conveyor means so that the return of said swaths or rows may be varied.

19. An aerator for hay rows as set forth in claim 11 including means to adjust the lateral placement of said second rear conveyor means with respect to said second header conveyor means so that the return of said swaths or rows may be varied.

* * * * *